Jan. 2, 1951  G. E. PETERS ET AL  2,536,084

SERVICE TRAY FOR AUTOMOBILE INSTRUMENT PANELS

Filed April 7, 1947

INVENTOR
GEORGE E. PETERS
LINUS E. RUSSELL
BY
ATTORNEY

Patented Jan. 2, 1951

2,536,084

UNITED STATES PATENT OFFICE 2,536,084

SERVICE TRAY FOR AUTOMOBILE
INSTRUMENT PANELS

George E. Peters and Linus E. Russell, Springfield, Ohio, assignors to Peters & Russell, Inc., Springfield, Ohio, a corporation of Ohio Application April 7, 1947, Serial No. 739,936

8 Claims. (Cl. 311—21)

This invention relates to automobile accessories and more particularly to a tray to be supported adjacent the windshield of an automobile.

A tray in which cigarettes, cigars, pipes, road maps or other articles may be placed has been found to be quite advantageous to the driver or passenger in an automobile. To this end there is disclosed herein a tray which may be supported upon the dash board adjacent the windshield. For illustrative purposes it has been shown as located in front of the driver on the left side of the windshield, but it is to be understood that such tray, by reversal may be used upon the opposite side of the car, or the right and left hand trays may be consolidated into a one-piece tray extending across the whole front of the car. Thus both left hand, right hand and continuous trays are contemplated and are deemed to be within the scope of the present invention.

The object of the present invention is to improve the construction as well as the means and mode of assembly of such trays, including the means of attaching said trays to an automobile whereby they may not only be economically manufactured, but will be more efficient and satisfactory in use, of relatively few parts, and unlikely to get out of repair or become loose and wobbly.

A further object of the invention is to provide a tray which will be universal in its adaptability to automobiles of different manufacture.

A further object of the invention is to provide a tray to which different trims may be easily applied.

A further object of the invention is the provision of a tray to which different attaching means may be secured.

A further object of the invention is the provision of a tray of the type described, having the advantageous structural features and the inherent meritorious characteristics and mode of construction herein set forth.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawing, wherein the invention is illustrated in its preferred but not necessarily the only form of embodiment, Fig. 1 is a perspective view of the tray installed in the left corner of an automobile windshield so as to be in front of the driver.

Like parts are indicated by similar characters of reference throughout the several views.

Figure 1:
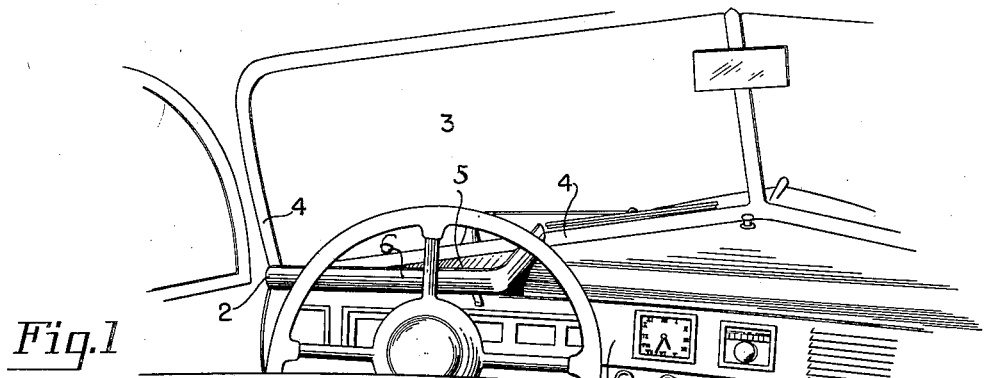

Referring to the drawings, there is shown in Fig. 1 a fragmentary view of the front of an automobile in which the dash board or instrument panel 1 supports the tray 2 comprising the subject matter of the present invention. Surrounding the windshield panels 3 is the usual molding 4 which seals the windshield and holds the glass panels 3 in place. It is by means of the molding 4 that the tray 2 is held in place, as will be more fully described.

The tray comprises a substantially triangular base portion 5 having an upstanding marginal flange 6—6' on two sides thereof. The open side of the base 5 has a series of relatively spaced parallel slots 7 in spaced parallel relation with the margin thereof, the slots being arranged in pairs at longitudinally spaced intervals along the base. The material intermediate the spaced slots 7 is slightly depressed forming an anchor member 8 with which the attaching members are engaged when assembled with the tray.

Figure 5:
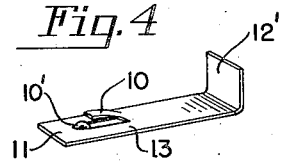

The attaching members 9 (Fig. 5) have a tongue 10 struck therefrom which engages in overlapping relation with the anchor member 8 when assembled. To assemble the attaching members 9 with the tray, the end 11 thereof is pushed inwardly through the slots 7 relative to the base 5, the attaching member being in overlying relation with the anchor member 8. As the anchor member 8 is engaged by the fixed end of the tongue 10, a small boss 10' in the attaching member opposite the fixed end of the tongue 10, engages the opposite side of the anchor member 8. The attaching member is securely held in its assembled position by the inherent resilience of the metal which interlocks the anchor member 8 intermediate the boss 10' and the fixed end of the tongue 10.

The molding 4 about the windshield is then loosened and the projecting ends 12 of the attaching members 9 are inserted therebeneath and the molding replaced. The tray 2 is thereby held in position by engagement of the attaching members 9 beneath the molding 4 of the windshield.

Figure 6:
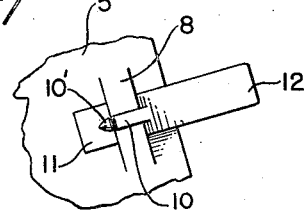
Figs. 5 and 6 are detail views of different types of attaching members.

Some automobiles do not use the molding 4 to seal the windshield, but directly seal the glass 3 into the frame. In such automobiles however, there is provided in the dash 1 a heat discharge vent adjacent the windshield for the purpose of defrosting the windshield. For this type of construction a modified form of attaching member 13 (Fig. 6) is used, in which the outer end 12' is bent in the same direction as is the tongue 10. This attaching member is assembled with the tray 2 in exactly the same manner as previously described. In attaching the tray 2 to an automobile of this type, the hook 12' is engaged within the heat discharge vent in the dash, in lieu of engagement beneath the molding 4 as previously described.

It is sometimes desirable to support the front of the tray 2 in relation to the dash board 1. This is particularly true when the modified form of attaching member 13 is used. To this end there is provided near the forward or right angle corner of the tray an angularly disposed supporting strut 14 (Fig. 10) to the lower end of which a rubber foot 15 is secured. The strut 14 is so proportioned that the foot 15 will engage the rest upon the dash board 1 when the tray 2 is placed in position thereon. The strut 14 is pivoted upon the under side of the base 5 by means of a rivet or other attaching means which permits some degree of adjustment in fitting the tray to different automobiles.

Figure 10:
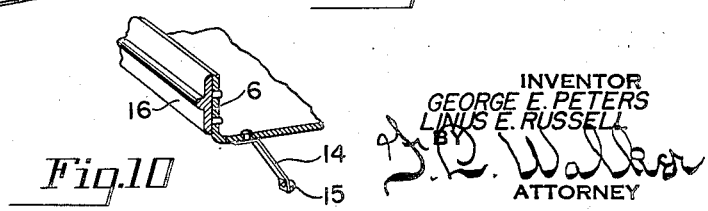
Fig. 10 shows a further modification in which a trim member has been applied to the tray of Figs. 2, 3, or 9.

The present tray is easily adapted to match different car interiors. For example, a plastic strip or other trim member 16 may be secured to the upstanding marginal flange 6 as is shown in Fig. 10. These trim strips may be of varying surface designs and colors, and any such strip may be easily applied to the tray 2.

Figures 4, 7, 8:
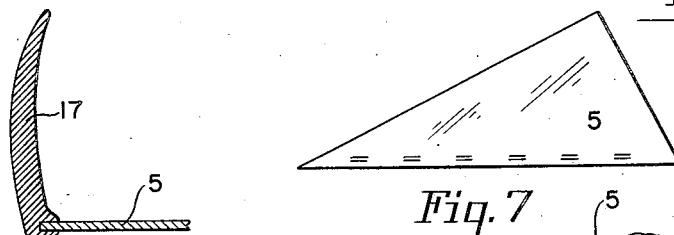
Fig. 4 is a detail bottom view showing the method of securing the desired attaching members to the tray.
Figs. 7 and 8 are detail views of a modified form of tray.

In lieu of attaching the trim member 16 to the upstanding flange 6, the flange may be molded from plastic or otherwise formed independently of the base 5, as shown in Fig. 8. In this instance the flange member 17 is separately fabricated and then secured to a base portion 5' which in this modification consists of merely a sheet of steel (Fig. 7) which has been incised to form the anchor members 8.

Figure 2:
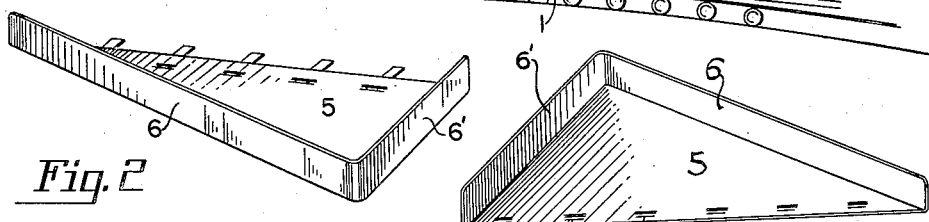
Fig. 2 is a perspective view of the tray removed from the car.
Figure 3:
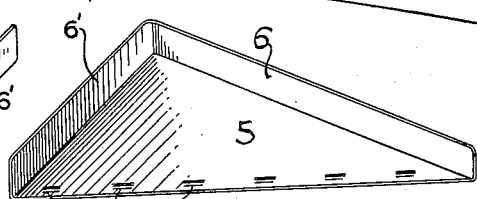
Fig. 3 is a perspective view, similar to Fig. 2, but viewed from the opposite side thereof, and without the attaching members being secured thereto.
Figure 9:
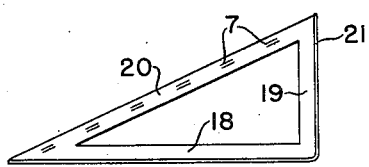
Fig. 9 shows a further modification of the present tray.

A further modification, although still within the scope of the present invention is shown in Fig. 9. In this form of construction the tray is similar to that shown in Figs. 2 and 3, but is of skeleton form, comprising interconnected members 18, 19 and 20. The upstanding flange 21 may be either the form shown in Fig. 8 or the same as the flange 6 described in connection with Figs. 2 and 3. The series of slots 7 are formed in the rear member 20 just as they are formed in the base 5 of the construction shown in Figs. 2, 3, and 7. A paperboard or other bottom is then placed upon the members 18, 19 and 20 to complete the tray assembly.

In all the modifications shown and described, the same slots 7 are provided within which the attaching members 9 and 13 (Figs. 5 and 6) are secured.

The present attaching members 9 comprising the projecting arms which are engageable beneath the molding 4 or within slots in the instrument panel, not only provide for the detachable engagement of the tray with the automobile, but provide means for adjusting the tray relative to the instrument panel. Thus the members of Fig. 5 may be inserted beneath the molding to different extent, or the hook 12' of Fig. 6 may be formed at a different distance relative to the base 5 when assembled therewith, thereby adjusting the tray relative to the windshield.

If it is desired to custom tailor the present trays for particular automobiles, the attaching members 9 of desired contour may be made integral with the base 5, or in lieu thereof, the attaching members may be permanently united with the base.

While for illustrative purposes, only right or left hand single trays have been shown in the drawing, the tray may be made double, that is, the right and left hand trays consolidated into an integral one-piece tray providing a continuous receptacle across the front of the automobile. In the double construction, the upstanding flange 6' may be eliminated, with the flange 6 extended along the entire rear margin of the base 5. Such double tray is provided with detachable and adjustable means for fitting the tray to the particular automobile in which it is to be used, it being secured to the automobile in the same manner as hereinbefore described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A tray for an automobile of the type having a windshield offset relative to the instrument panel affording a supporting shelf thereabove, including a substantially triangular base member to rest upon said shelf upstanding flanges on two sides thereof, a series of longitudinally spaced pairs of incisions in inwardly spaced parallel relation with the third side thereof, a series of depressions intermediate the incisions of each pair, a plurality of attaching members detachably engageable with the tray and with the automobile within the offset intermediate the windshield and instrument panel, a tongue struck from said attaching members and extending into spaced relation therewith, the construction and arrangement being such that the attaching members may be inserted through the incisions in the base in overlying relation with said depressions, the tongue being engageable in overlapping relation with said depression.

2. A tray for an automobile of the type having a windshield offset relative to the instrument panel affording a supporting shelf thereabove, including a base member to rest upon said shelf upstanding flanges on all but one margin thereof, relatively spaced parallel incisions in parallel relation with the open margin thereof, the base being offset intermediate said spaced incisions, a plurality of different attaching members detachably engageable with the base, any one of said plurality being insertable through said incisions in overlapping relation with the offset portion of the base, locking means on said attaching member engageable with the offset portion of the base to retain the attaching member in engagement with said base, said attaching members being detachably engageable with the automobile within the offset intermediate the windshield and instrument panel, the construction and arrangement being such that different attaching members may be secured to the tray in accordance with the type of automobile to which the tray is to be secured.

3. A tray for an automobile of the type having a windshield molding in offset relation with the instrument panel thereof, including a base member, a marginal flange thereon, a plurality of attaching members detachably engageable beneath the windshield molding and means for detachably engaging said attaching members with the tray including an offset portion in the base of said tray, spaced slots forming the longitudinal margins of the offset portion, the construction and arrangement being such that the attaching members may be inserted within the slots in overlapping relation with the depression, and locking members on the attaching member engageable with the depression to lock the attaching member in assembled relation therewith.

4. A tray for an automobile of the type having a windshield offset relative to the instrument panel affording a supporting shelf thereabove, including a base member to rest upon said shelf, upstanding flanges on all but one margin thereof, a plurality of attaching members carried by said base member and engageable with the supporting shelf, a locking member on said attaching members and an adjustable foot carried by said base and engageable with said shelf to support the tray in predetermined position thereon, the construction and arrangement being such that the attaching members may be detachably engaged with the automobile within the offset to retain the tray in predetermined position upon said shelf.

5. A tray for an automobile of the type having a windshield offset relative to the instrument panel affording a supporting shelf thereabove, including a base member removably engageable with the automobile within the offset and resting upon said shelf, upstanding flanges on all but one side thereof, a plurality of attaching members on said base, said members being removably engageable with the automobile, and an oscillatory arm on said base upon which at least one of said attaching members is carried to support the base in preselected relation with the supporting shelf.

6. A tray for an automobile instrument panel, including a base member, an upstanding flange on all but one side thereof, means for attaching said base member to the automobile including an oscillatory arm, one end of which is removably engageable with the automobile instrument panel, and additional supporting members on said base adjacent the open side thereof, the oscillatory arm and supporting members being removably engageable with the automobile in various positions of adjustment relative thereto.

7. A tray for an automobile of the type having a windshield assembly offset relative to the instrument panel affording a supporting shelf thereabove, including a base member, an upstanding marginal flange secured to a portion on said base member, projections on said base member opposite the upstanding flange, said projections affording means for detachably engaging said base member with the windshield assembly, and an arm suspended from said base member adjacent the upstanding flange and capable of relative swinging motion for selective rest engagement with the supporting shelf.

8. A tray for an automobile of the type having a windshield offset relative to the instrument panel affording a supporting shelf thereabove, including a base member, an upstanding marginal flange on a portion thereof, attachment means suspended from the base member adjacent the edge thereof opposite said marginal flange, and a foot member suspended from said base member adjacent said marginal flange to rest on the supporting shelf.

GEORGE E. PETERS.
LINUS E. RUSSELL.

REFERENCES CITED

The following references are of record in the file of this patent:

UNITED STATES PATENTS

| Number | Name | Date |
|---|---|---|
| 580,199 | Sommerfield | Apr. 6, 1897 |
| 598,116 | Rose et al. | Feb. 1, 1898 |
| 797,451 | McBryde | Aug. 15, 1905 |
| 1,074,173 | Hines | Sept. 30, 1913 |
| 1,106,282 | Coats | Aug. 4, 1914 |
| 1,309,965 | Schwab | July 15, 1919 |
| 1,360,180 | Congdon | Nov. 23, 1920 |
| 1,487,574 | Jordan | Mar. 18, 1924 |
| 1,493,036 | Hay | May 6, 1924 |
| 1,571,000 | Eustis | Jan. 26, 1926 |
| 1,723,238 | Hoot | Aug. 6, 1929 |
| 1,788,800 | McGinley | Jan. 13, 1931 |
| 1,964,339 | Brassell | June 26, 1934 |
| 2,372,381 | Kramer | Mar. 27, 1945 |

FOREIGN PATENTS

| Number | Country | Date |
|---|---|---|
| 354,071 | Great Britain | Aug. 6, 1931 |
| 434,898 | Great Britain | Sept. 11, 1938 |